(12) United States Patent
Ozawa et al.

(10) Patent No.: US 11,800,070 B2
(45) Date of Patent: Oct. 24, 2023

(54) CONTROL METHOD FOR PROJECTOR, PROJECTOR, AND IMAGE PROJECTION SYSTEM

(71) Applicant: SEIKO EPSON CORPORATION, Tokyo (JP)

(72) Inventors: Takaaki Ozawa, Shiojiri (JP); Morio Matsumoto, Matsumoto (JP); Takeo Koshiba, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/558,758

(22) Filed: Dec. 22, 2021

(65) Prior Publication Data

US 2022/0210382 A1 Jun. 30, 2022

(30) Foreign Application Priority Data

Dec. 24, 2020 (JP) .................................. 2020-214762

(51) Int. Cl.
*H04N 9/31* (2006.01)

(52) U.S. Cl.
CPC ............ *H04N 9/3147* (2013.01); *H04N 9/31* (2013.01); *H04N 9/3185* (2013.01)

(58) Field of Classification Search
CPC ...... G03B 21/00; G03B 21/14; G03B 21/006; G03B 21/008; G03B 21/28; G03B 21/142; G03B 21/147; H04N 9/31; H04N 9/3147; H04N 9/3185; H04N 9/3194
See application file for complete search history.

(56) References Cited

U.S. PATENT DOCUMENTS

| | | | |
|---|---|---|---|
| 2014/0078271 A1* | 3/2014 | Oda | H04N 13/341 348/56 |
| 2017/0310938 A1* | 10/2017 | Okamura | H04N 5/20 |
| 2019/0191134 A1* | 6/2019 | Urano | H04N 9/3185 |
| 2019/0361332 A1* | 11/2019 | Kurota | H04N 9/3155 |
| 2021/0136339 A1* | 5/2021 | Kashiwagi | H04N 9/3182 |
| 2021/0235052 A1 | 7/2021 | Fuchikami | |

FOREIGN PATENT DOCUMENTS

| | | |
|---|---|---|
| JP | 2019-201363 | 11/2019 |
| JP | 2019-207392 | 12/2019 |
| JP | 2020-127162 | 8/2020 |

OTHER PUBLICATIONS

Epson Projector Professional Tool Operation Guide, 2021—63 pages.

* cited by examiner

*Primary Examiner* — Sultan Chowdhury
(74) *Attorney, Agent, or Firm* — Dority & Manning, P.A.

(57) ABSTRACT

A control method for a projector includes coupling a projector to another projector, transmitting first instruction information representing a start of setting of stack projection using the projector and the other projector to the other projector by the projector, setting a first projection range indicating a range in which the projector projects an image for the stack projection, and transmitting second instruction information representing adjustment to make a second projection range indicating a range in which the other projector projects an image coincide with the first projection range to the other projector by the projector.

6 Claims, 8 Drawing Sheets

CONTROL METHOD FOR PROJECTOR, PROJECTOR, AND IMAGE PROJECTION SYSTEM

The present application is based on, and claims priority from JP Application Serial Number 2020-214762, filed Dec. 24, 2020, the disclosure of which is hereby incorporated by reference herein in its entirety.

BACKGROUND

1. Technical Field

The present disclosure relates to a control method for a projector, a projector, and an image projection system.

2. Related Art

In related art, a technique relating to the so-called "stack projection" to superimpose projected images of a plurality of projectors is known (for example, see JP-A-2019-207392).

JP-A-2019-207392 discloses a projection control apparatus that controls projection areas of a plurality of projectors.

However, in the technique disclosed in JP-A-2019-207392, operation of the plurality of projectors and setting up of a network environment are necessary, and user's work becomes complex.

SUMMARY

An aspect of the present disclosure is directed to a control method for a projector communicably coupled to another projector, including setting the other projector as a projector for stack projection, determining a first projection range indicating a range in which an image is projected, and controlling the other projector to adjust a second projection range indicating a range in which the other projector projects an image to make the second projection range coincide with the first projection range.

Another aspect of the present disclosure is directed to a projector including a control section and communicably coupled to another projector, and the control section sets the other projector as a projector for stack projection, determines a first projection range indicating a range in which an image is projected, and controls the other projector to adjust a second projection range indicating a range in which the other projector projects an image to make the second projection range coincide with the first projection range.

Yet another aspect of the present disclosure is directed to an image projection system including a main projector and a sub-projector communicably coupled to the main projector, and the main projector sets the sub-projector as a projector for stack projection, determines a first projection range indicating a range in which an image is projected, and controls the sub-projector to adjust a second projection range indicating a range in which the sub-projector projects an image to make the second projection range coincide with the first projection range.

DESCRIPTION OF EXEMPLARY EMBODIMENTS

As below, embodiments will be explained with reference to the drawings.

The embodiments include a first embodiment to be described with reference to FIGS. 3 to 7 and a second embodiment to be described with reference to FIG. 8.

Figure 1:
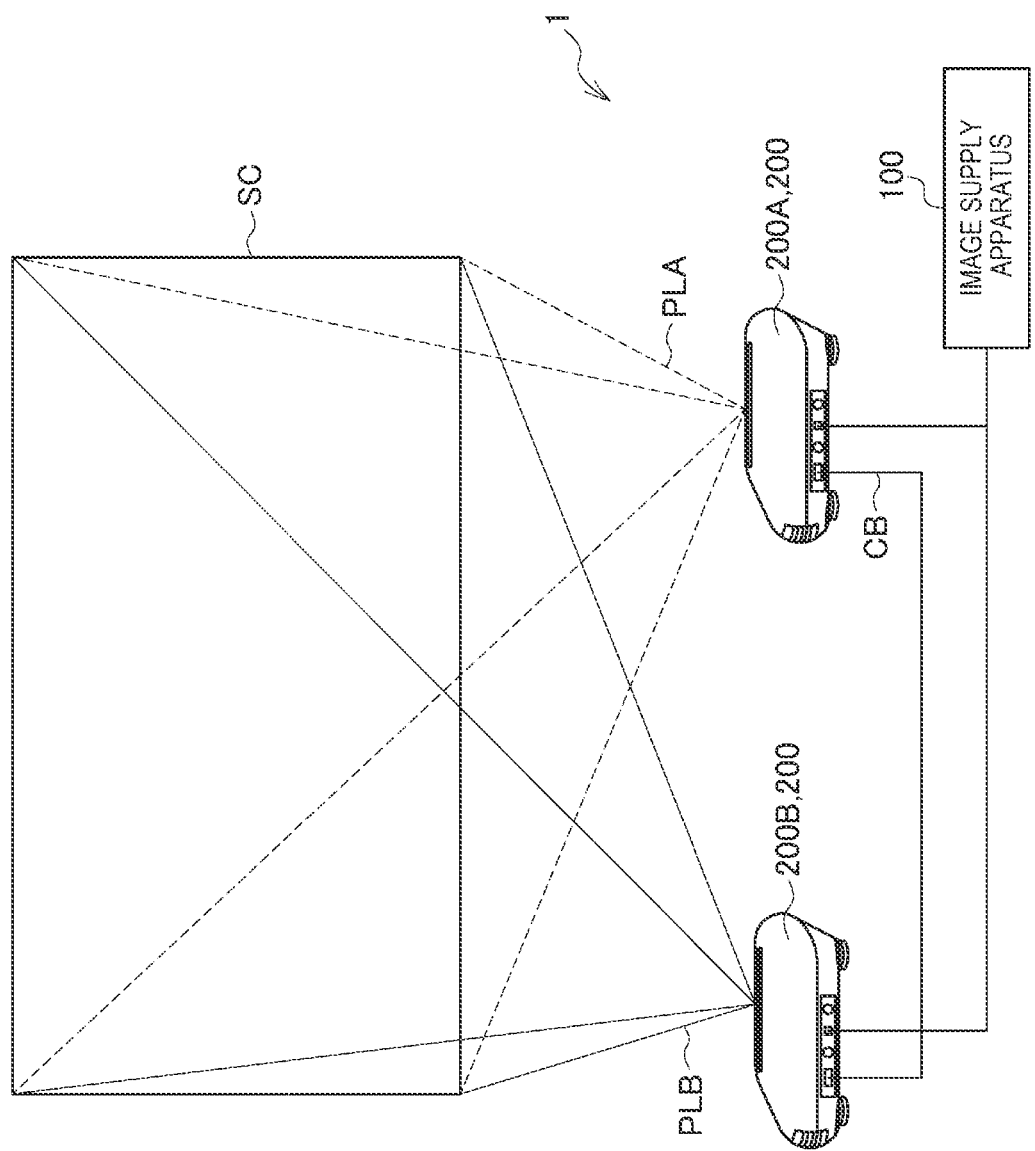
FIG. 1 shows an example of a configuration of an image projection system according to embodiments.

FIG. 1 shows an example of a configuration of an image projection system 1 according to the embodiments.

The image projection system 1 includes an image supply apparatus 100, a first projector 200A, and a second projector 200B.

The image supply apparatus 100 includes e.g. a personal computer or the like and supplies images to the respective first projector 200A and second projector 200B. For example, the image supply apparatus 100 supplies images generated by reproduction of contents to the respective first projector 200A and second projector 200B via Ethernet (registered trademark) cables.

In the embodiments, the image supply apparatus 100 is coupled to make wired communication to the first projector 200A and the second projector 200B via Ethernet (registered trademark) cables or the like or may be coupled to make wireless communication via Wi-Fi (registered trademark) or the like.

In the embodiments, the image supply apparatus 100 includes the personal computer, however, the image supply apparatus 100 may include a tablet terminal, a smartphone, or the like.

The first projector 200A and the second projector 200B are communicably coupled one-on-one e.g. Peer to Peer by a cable CB.

The cable CB is e.g. an Ethernet (registered trademark) cable.

The first projector 200A and the second projector 200B communicate according to e.g. TCP/IP standards.

The first projector 200A corresponds to examples of "projector" and "main projector".

The second projector 200B corresponds to examples of "another projector" and "sub-projector".

In the following explanation, when it is not necessary to distinguish the first projector 200A and the second projector 200B, the projectors may be referred to as "projector 200".

For example, the first projector 200A and the second projector 200B are arranged in horizontal directions. In other words, the respective first projector 200A and second projector 200B are arranged along directions parallel to a screen SC.

The first projector 200A projects an image light PLA on the screen SC. The second projector 200B projects an image light PLB on the screen SC.

Further, the first projector 200A and the second projector 200B project the image light PLA and the image light PLB, respectively, so that the image light PLA and the image light PLB are superimposed on each other on the screen SC.

In the following explanation, when the image light PLA and the image light PLB are not distinguished, the image lights may be referred to as "image light PL".

Figure 2:
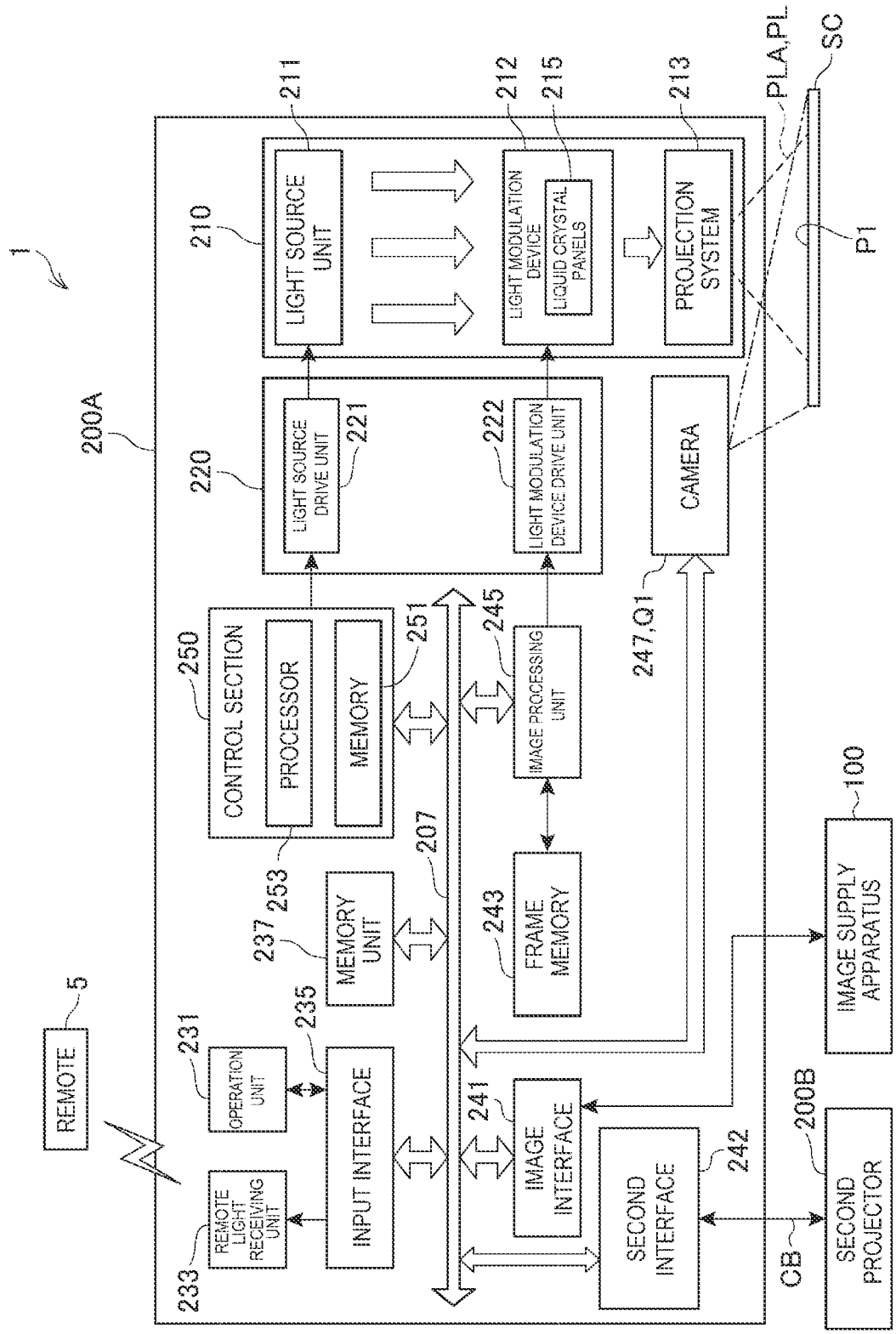
FIG. 2 shows an example of a configuration of a projector according to the embodiments.

FIG. 2 shows an example of a configuration of the projector 200 according to the embodiments.

The first projector 200A and the second projector 200B have substantially the same configuration as each other, and the configuration of the first projector 200A will be explained with reference to FIG. 2 and the explanation of the configuration of the second projector 200B will be omitted.

As shown in FIG. 2, the first projector 200A includes a projection section 210, and a drive section 220 driving the projection section 210. The projection section 210 forms an optical image and projects the image on the screen SC. Note that, in the embodiments, the projection section 210 projects an image corresponding to image data from the image supply apparatus 100 on the screen SC.

The projection section 210 includes a light source unit 211, a light modulation device 212, and a projection system 213. The drive section 220 includes a light source drive unit 221 and a light modulation device drive unit 222.

The light source unit 211 includes a lamp light source such as a halogen lamp, a xenon lamp, or a super high-pressure mercury lamp or a solid-state light source such as an LED (Light Emitting Diode) or a laser light source.

The light source unit 211 may include a reflector and an auxiliary reflector that guide the light emitted by the light source to the light modulation device 212. Further, the light source unit 211 may include a lens group or a polarizer for increasing optical characteristics of the projected light or a dimming element that reduces the amount of light emitted by the light source in a path to the light modulation device 212.

The light source drive unit 221 is coupled to an internal bus 207 and turns on and off the light source of the light source unit 211 according to an instruction from the control section 250, which is also coupled to the internal bus 207.

For example, the light modulation device 212 includes three liquid crystal panels 215 corresponding to three primary colors of R, G, and B. R shows red, G shows green, and B shows blue. That is, the light modulation device 212 includes the liquid crystal panel 215 corresponding to R color light, the liquid crystal panel 215 corresponding to G color light, and the liquid crystal panel 215 corresponding to B color light.

The light emitted by the light source unit 211 is separated into color lights of three colors of RGB and respectively entered into the corresponding liquid crystal panels 215. The respective three liquid crystal panels 215 are transmissive liquid crystal panels and modulate the transmitted lights and generate the image lights PLA. The image lights PLA modulated through the respective liquid crystal panels 215 are combined by a combining system such as a cross dichroic prism and output to the projection system 213.

In the embodiments, the case where the light modulation device 212 includes the transmissive liquid crystal panels 215 as light modulation elements is explained, however, the present disclosure is not limited to that. The light modulation elements may be reflective liquid crystal panels or digital micromirror devices.

The light modulation device 212 is driven by the light modulation device drive unit 222. The light modulation device drive unit 222 is coupled to an image processing unit 245.

Image data corresponding to the respective primary colors of R, G, B is input from the image processing unit 245 to the light modulation device drive unit 222. The light modulation device drive unit 222 converts the input image data into data signals suitable for operation of the liquid crystal panels 215. The light modulation device drive unit 222 applies voltages to the respective pixels of the respective liquid crystal panels 215 based on the converted data signals and draws images on the respective liquid crystal panels 215.

The projection system 213 includes a lens, a mirror, etc. that form an image of the entered image light PL on the screen SC. Further, the projection system 213 includes a zoom mechanism that enlarges or reduces the image projected on the screen SC, a focus adjustment mechanism that adjusts the focus, a lens-shift mechanism that adjusts the projection direction of the image light PL, etc.

The first projector 200A further includes an operation unit 231, a remote light receiving unit 233, an input interface 235, a memory unit 237, an image interface 241, a second interface 242, a frame memory 243, the image processing unit 245, a camera 247, and the control section 250. The input interface 235, the memory unit 237, the image interface 241, the second interface 242, the image processing unit 245, the camera 247, and the control section 250 are communicably coupled to one another via the internal bus 207.

The operation unit 231 includes various buttons and switches provided on the surface of the housing of the first projector 200A, and generates and outputs operation signals corresponding to the operation of these buttons and switches to the input interface 235. The input interface 235 includes a circuit that outputs the operation signals input from the operation unit 231 to the control section 250.

The remote light receiving unit 233 receives an infrared signal transmitted from a remote 5, decodes the received infrared signal, and generates an operation signal. The remote light receiving unit 233 outputs the generated operation signal to the input interface 235. The input interface 235 outputs the operation signal input from the remote light receiving unit 233 to the control section 250.

The memory unit 237 is e.g. a magnetic recording device such as an HDD or a memory device using a semiconductor memory device such as a flash memory. The memory unit 237 stores a program executed by the control section 250, data processed by the control section 250, image data, etc.

The image interface 241 includes a connector and an interface circuit and is configured to make wired connection to the image supply apparatus 100. The image interface 241 is e.g. a communication interface that executes communication with the image supply apparatus 100 according to the Ethernet (registered trademark) standards. The image interface 241 receives image data from the image supply apparatus 100.

The second interface 242 is a communication interface that executes communication with the second projector 200B according to the Ethernet (registered trademark) standards. The second interface 242 includes a connector to which an Ethernet (registered trademark) cable is coupled and an interface circuit that processes a signal transmitted through the connector. The second interface 242 is an interface board having a connector and an interface circuit and coupled to a main board on which a processor 253 of the control section 250 etc. are mounted. Or, the connector and the interface circuit forming the second interface 242 are mounted on the main board of the control section 250. The second interface 242 transmits e.g. various kinds of setting information and various kinds of instruction information to the second projector 200B.

The control section 250 includes a memory 251 and the processor 253.

The memory 251 is a memory device that stores a program and data executed by the processor 253 in a non-volatile manner. The memory 251 includes a magnetic memory device, a semiconductor memory device such as a flash ROM, or another type of non-volatile memory device. Further, the memory 251 may include a RAM forming a work area of the processor 253. The memory 251 stores data processed by the control section 250 and a control program executed by the processor 253.

The processor 253 may be formed using a single processor, or a plurality of processors may function as the processor 253. The processor 253 controls the respective units of the first projector 200A by executing the control program. For example, the processor 253 outputs an execution instruction of image processing corresponding to the operation received by the operation unit 231 and the remote 5 and parameters used for the image processing to the image processing unit 245. The parameters include e.g. a geometric correction parameter for correction of geometric distortion of the image projected on the screen SC. Further, the processor 253 controls the light source drive unit 221 to control turning on and off of the light source unit 211 and adjusts brightness of the light source unit 211.

The image processing unit 245 and the frame memory 243 may be formed using e.g. an integrated circuit. The integrated circuit includes an LSI, an ASIC (Application Specific Integrated Circuit), and a PLD (Programmable Logic Device). The PLD includes e.g. an FPGA (Field-Programmable Gate Array). A part of the configuration of the integrated circuit may include an analog circuit or a combination of a processor and an integrated circuit may be employed. The combination of a processor and an integrated circuit is called a microcontroller (MCU), an SoC (System-on-a-chip), a system LSI, a chip set, or the like.

The image processing unit 245 develops the image data input from the image interface 241 in the frame memory 243. The frame memory 243 includes a plurality of banks. Each bank has storage capacity in which image data for one frame can be written. The frame memory 243 includes e.g. an SDRAM (Synchronous Dynamic Random Access Memory).

The image processing unit 245 performs image processing of e.g. resolution conversion processing or resizing processing, distortion correction, shape correction processing, digital zooming processing, adjustment of image tint and brightness, or the like on the image data developed in the frame memory 243.

Further, the image processing unit 245 generates a vertical synchronizing signal having a drawing frequency converted from an input frame frequency. The generated vertical synchronizing signal is called an output synchronizing signal. The image processing unit 245 outputs the generated output synchronizing signal to the light modulation device drive unit 222.

The camera 247 captures a first projected image P1 projected on the screen SC and generates a first captured image Q1. The first captured image Q1 is output to the control section 250. The first projected image P1 corresponds to the image light PLA.

Note that, in the second projector 200B, the camera 247 captures a second projected image P2 projected on the screen SC and generates a second captured image Q2. The second captured image Q2 is output to the control section 250. The second projected image P2 corresponds to the image light PLB.

In the embodiments, the case where each of the first projector 200A and the second projector 200B includes the camera 247 is explained, however, the present disclosure is not limited to the case. A camera may capture the first projected image P1, generate the first captured image Q1, capture the second projected image P2, and generate the second captured image Q2. For example, a camera may be placed outside of the first projector 200A and the second projector 200B and the camera may capture the first projected image P1 and the second projected image P2 and generate the first captured image Q1 and the second captured image Q2.

First Embodiment

Next, referring to FIGS. 3 to 5, processing by the control section 250 of the first projector 200A and processing by the control section 250 of the second projector 200B according to the first embodiment will be explained.

Note that, in the following explanation, for convenience, the control section 250 of the first projector 200A may be referred to as "first projector 200A" and the control section 250 of the second projector 200B may be referred to as "second projector 200B".

Figure 3:
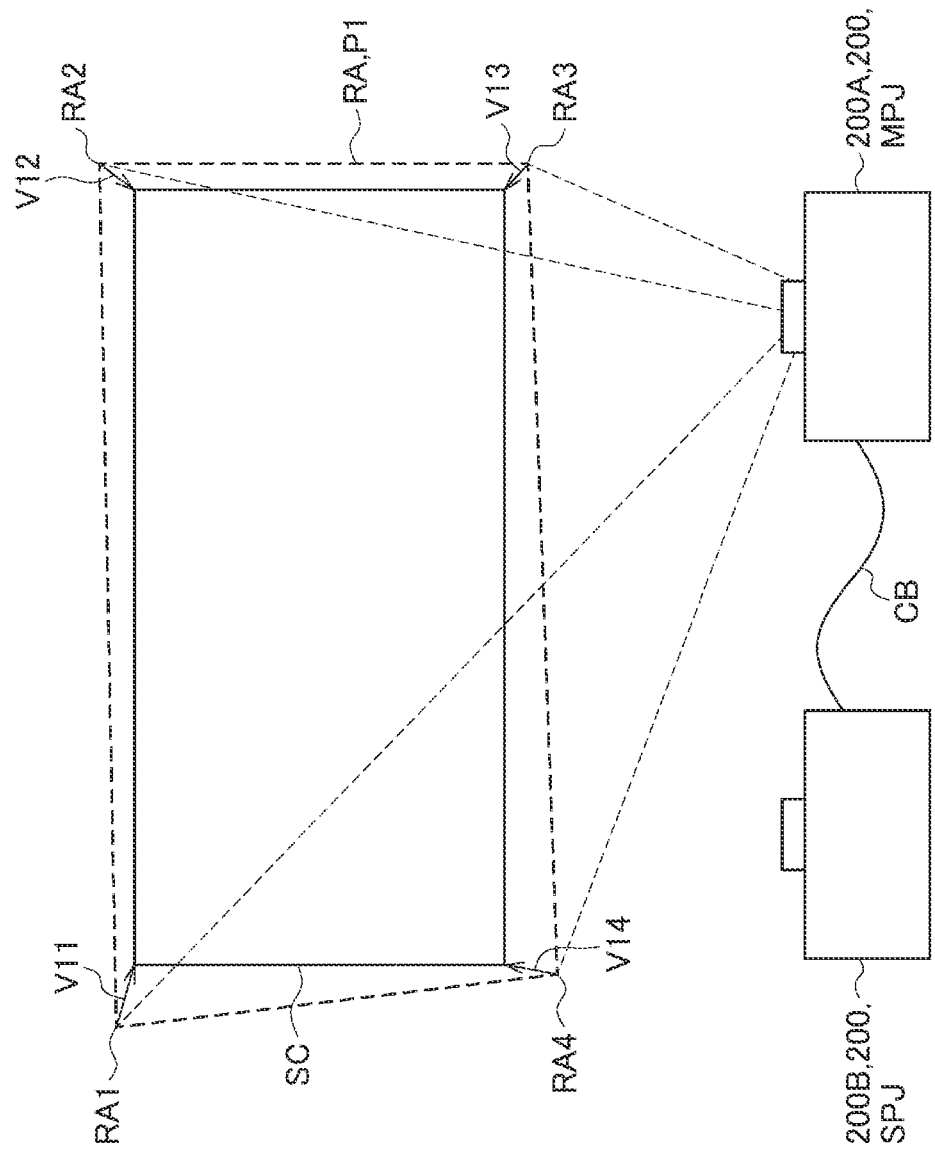
FIG. 3 shows an example of an adjustment method for a first projection range.

FIG. 3 shows an example of an adjustment method for a first projection range RA.

In the respective first projector 200A and second projector 200B, DHCP (Dynamic Host Configuration Protocol) settings are set to be ON in advance.

First, as shown in FIG. 3, the first projector 200A and the second projector 200B are communicably coupled by the user with the cable CB according to the TCP/IP standards.

Then, the respective first projector 200A and second projector 200B are activated by user's operation on the respective first projector 200A and second projector 200B.

Then, according to the DHCP settings, the first projector 200A is set as a master projector MPJ and the second projector 200B is set as a slave projector SPJ.

The first projector 200A is set as the master projector MPJ and the second projector 200B is set as the slave projector SPJ, and thereby, the second projector 200B can be operated according to instruction information from the first projector 200A.

Then, stack projection settings are started for the respective first projector 200A and second projector 200B by user's operation on the respective first projector 200A and second projector 200B.

The stack projection settings show settings for displaying one image by superimposition of the first projected image P1 projected by the first projector 200A and the second projected image P2 projected by the second projector 200B.

The stack projection settings are made, and thereby, "stacking assist processing", which will be described later with reference to FIGS. 4 and 5, can be executed.

Then, the first projector 200A projects the first projected image P1 by user's operation. The first projected image P1 is e.g. a solid image in cyan.

In FIG. 3, the first projected image P1 is projected in the first projection range RA. The first projection range RA indicates a range in which the first projector 200A projects an image.

The first projection range RA is defined by a first corner portion RA1, a second corner portion RA2, a third corner portion RA3, and a fourth corner portion RA4. The first corner portion RA1 refers to an upper left corner of the first projection range PA. The second corner portion RA2 refers to an upper right corner of the first projection range RA. The third corner portion RA3 refers to a lower right corner of the first projection range RA. The fourth corner portion RA4 refers to a lower left corner of the first projection range RA.

In the embodiment, the case where the first projected image P1 is the cyan solid image is explained, however, the present disclosure is not limited to the case. The first projected image P1 may be an image for which the positions of the first corner portion RA1, the second corner portion RA2, the third corner portion RA3, and the fourth corner portion RA4 can be visually recognized by the user. For example, the first projected image P1 may be first marks MA, which will be described later with reference to FIG. 4.

The control section 250 of the first projector 200A adjusts the first projection range RA to make the first projection range RA coincide with the projection surface of the screen SC according to the user's operation.

Specifically, the first projection range RA is adjusted to make the first corner portion RA1 coincide with the upper left corner of the projection surface of the screen SC, make the second corner portion RA2 coincide with the upper right corner of the projection surface of the screen SC, make the third corner portion RA3 coincide with the lower right corner of the projection surface of the screen SC, and make the fourth corner portion RA4 coincide with the lower left corner of the projection surface of the screen SC.

In other words, the first projection range RA is adjusted to move the first corner portion RA1 by a first vector V11, move the second corner portion RA2 by a second vector V12, move the third corner portion RA3 by a third vector V13, and move the fourth corner portion RA4 by a fourth vector V14.

The first vector V11 is a vector starting from the first corner portion RA1 and ending on the upper left corner of the projection surface of the screen SC and specifies the movement direction and the movement amount of the first corner portion PA1. The second vector V12 is a vector starting from the second corner portion RA2 and ending on the upper right corner of the projection surface of the screen SC and specifies the movement direction and the movement amount of the second corner portion RA2. The third vector V13 is a vector starting from the third corner portion RA3 and ending on the lower right corner of the projection surface of the screen SC and specifies the movement direction and the movement amount of the third corner portion RA3. The fourth vector V14 is a vector starting from the fourth corner portion RA4 and ending on the lower left corner of the projection surface of the screen SC and specifies the movement direction and the movement amount of the fourth corner portion RA4.

Note that the user adjusts the first projection range RA to make the first projection range RA coincide with the projection surface of the screen SC by lens-shift adjustment, zoom adjustment, focus adjustment, and quick corner adjustment processing.

The lens-shift adjustment refers to adjustment using the lens-shift mechanism of the projection system 213 according to the user's operation. The zoom adjustment refers to adjustment using the zoom mechanism of the projection system 213 according to the user's operation. The focus adjustment refers to adjustment using the focus adjustment mechanism of the projection system 213 according to the user's operation.

The quick corner adjustment refers to adjustment of adjusting the first projection range RA to make the first projection range RA coincide with the projection surface of the screen SC by the control section 250 of the first projector 200A based on an image containing the first projection range RA and the screen SC captured by the camera 247.

Next, an adjustment method for a second projection range RB will be explained with reference to FIGS. 4 and 5.

Figure 4:
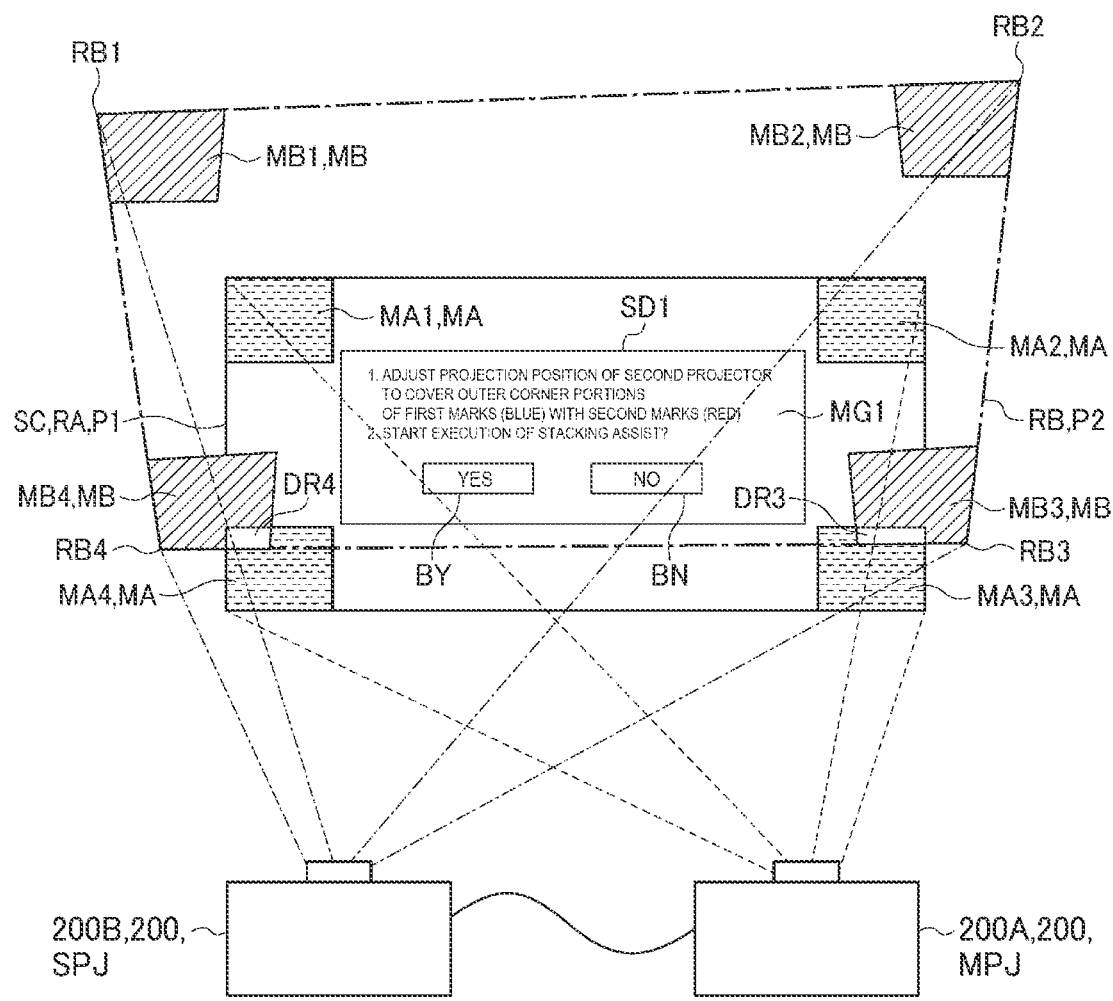
FIG. 4 shows an example of a state before adjustment of a second projection range.
Figure 5:
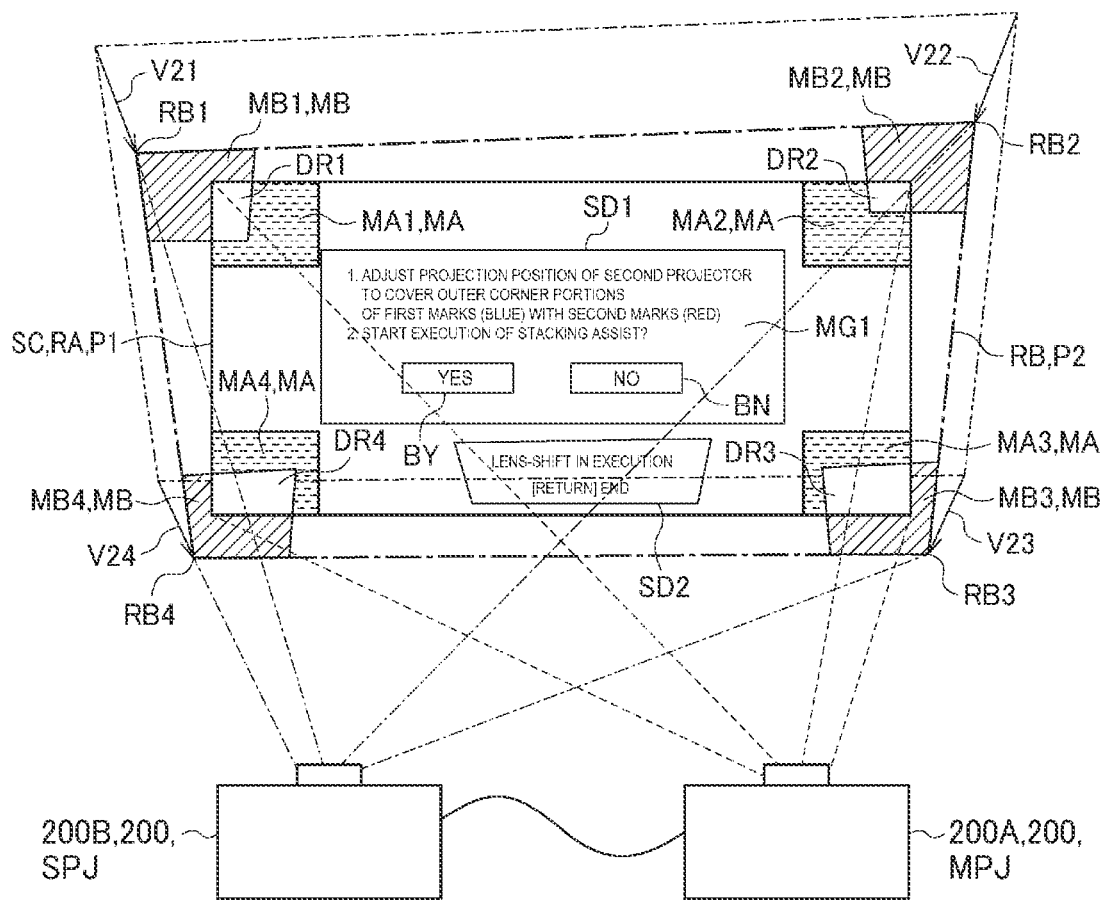
FIG. 5 shows an example of a state after adjustment of the second projection range by a user.

FIG. 4 shows a state before adjustment of the second projection range RB, and FIG. 5 shows a state after adjustment of the second projection range RB by the user.

As shown in FIG. 4, the first projector 200A displays the first marks MA as the first projected image P1 by user's operation.

The first marks MA show the corner portions of the first projection range RA. The first marks MA include a corner portion mark MA1, a corner portion mark MA2, a corner portion mark MA3, and a corner portion mark MA4.

The corner portion mark MA1 shows the position of the upper left corner of the first projection range RA. The corner portion mark MA2 shows the position of the upper right corner of the first projection range RA. The corner portion mark MA3 shows the position of the lower right corner of the first projection range RA. The corner portion mark MA4 shows the position of the lower left corner of the first projection range RA.

The respective corner portion mark MA1 to corner portion mark MA4 are e.g. rectangular cyan solid images. When the color is expressed by e.g. a 256-level RGB representation system, cyan is expressed by (0,255,255).

The two adjacent sides of the respective corner portion mark MA1 to corner portion mark MA4 are placed along the outer edge of the first projection range RA. For example, the left side and the upper side of the corner portion mark MA1 are placed along the outer edge of the first projection range RA. Further, for example, the right side and the upper side of the corner portion mark MA2 are placed along the outer edge of the first projection range RA.

The second projector 200B displays second marks MB as the second projected image P2 by user's operation. The second projection range RB indicates a range in which the second projector 200B projects an image.

The second projection range RB is defined by a first corner portion RB1, a second corner portion RB2, a third corner portion RB3, and a fourth corner portion RB4. The first corner portion RB1 refers to an upper left corner of the second projection range RB. The second corner portion RB2 refers to an upper right corner of the second projection range RB. The third corner portion RB3 refers to a lower right corner of the second projection range RB. The fourth corner portion RB4 refers to a lower left corner of the second projection range RB.

The second marks MB show positions of the corner portions of the second projection range RB. The second marks MB include a corner portion mark MB1, a corner portion mark MB2, a corner portion mark MB3, and a corner portion mark MB4.

The corner portion mark MB1 shows the position of the upper left corner of the second projection range RB, i.e., the first corner portion RB1. The corner portion mark MB2 shows the position of the upper right corner of the second projection range RB, i.e., the second corner portion RB2. The corner portion mark MB3 shows the position of the lower right corner of the second projection range RB, i.e., the third corner portion RB3. The corner portion mark MB4 shows the position of the lower left corner of the second projection range RB, i.e., the fourth corner portion RB4.

The respective corner portion mark MB1 to corner portion mark MB4 are e.g. rectangular red solid images. When the color is expressed by e.g. a 256-level RGB representation system, red is expressed by (255,0,0).

The two adjacent sides of the respective corner portion mark MB1 to corner portion mark MB4 are placed along the outer edge of the second projection range RB. For example, the left side and the upper side of the corner portion mark MB1 are placed along the outer edge of the second projection range RB. Further, for example, the right side and the upper side of the corner portion mark MB2 are placed along the outer edge of the second projection range RB.

In FIG. 4, the second projection range RB is distorted in a trapezoidal shape having an upper side longer than a lower side, and the respective corner portion mark MB1 to corner portion mark MB4 are distorted in trapezoidal shapes.

The lower left corner of the corner portion mark MB3 is superimposed on the upper right corner of the corner portion mark MA3 to form a superimposed area DR3. The lower right corner of the corner portion mark MB4 is superimposed on the upper left corner of the corner portion mark MA4 to form a superimposed area DR4. The respective corner portion mark MA3 and corner portion mark MA4 are cyan solid images and the respective corner portion mark MB3 and corner portion mark MB4 are red solid images, and, therefore, the superimposed area DR3 and the superimposed area DR4 are displayed in white.

Further, the first projector 200A displays an adjustment instruction display part SD1 by user's operation.

The adjustment instruction display part SD1 is displayed as an OSD (On-Screen Display) of the first projector 200A. The adjustment instruction display part SD1 contains a message display portion MG1, a YES button BY, and a NO button BN.

In the message display portion MG1, guidance for the user is displayed. In the message display portion MG1, for example, "1. ADJUST PROJECTION POSITION OF SECOND PROJECTOR TO COVER OUTER CORNER PORTIONS OF FIRST MARKS (BLUE) WITH SECOND MARKS (RED). 2. START EXECUTION OF STACKING ASSIST?" is displayed.

When the first projector 200A detects user's operation to press the YES button BY, the first projector 200A instructs the second projector 200B to execute stacking assist processing. The second projector 200B executes the stacking assist processing according to the instruction from the first projector 200A.

The stacking assist processing will be explained later with reference to FIG. 5.

When the first projector 200A detects user's operation to press the NO button BN, the first projector 200A does not output instruction information to the second projector 200B.

The user operates the second projector 200B according to the guidance displayed in the message display portion MG1 and adjusts the projection position of the second projector to cover the outer corner portions of the first marks MA with the second marks MB. Specifically, the user adjusts the projection position of the second projector by performing the lens-shift adjustment, the zoom adjustment, and the focus adjustment of the second projector 200B. As a result, the second marks MB shown in FIG. 5 are displayed.

That is, as a result of the lens-shift adjustment, the zoom adjustment, and the focus adjustment of the second projector 200B by the user, the second projection range RB is adjusted from the state shown in FIG. 4 to the state shown in FIG. 5.

The second projection range RB is defined by the first corner portion RB1, the second corner portion RB2, the third corner portion RB3, and the fourth corner portion RB4. The first corner portion RB1 refers to an upper left corner of the second projection range RB. The second corner portion RB2 refers to an upper right corner of the second projection range RB. The third corner portion RB3 refers to a lower right corner of the second projection range RB. The fourth corner portion RB4 refers to a lower left corner of the second projection range RB.

As shown in FIG. 5, as a result of operation of the second projector 200B by the user, compared to the second projection range RB shown in FIG. 4, the second projection range RB is adjusted to move the first corner portion RB1 by a first vector V21, move the second corner portion RB2 by a second vector V22, move the third corner portion RB3 by a third vector V23, and move the fourth corner portion RB4 by a fourth vector V24.

The second marks MB show positions of the corner portions of the second projection range RB. The second marks MB include the corner portion mark MB1, the corner portion mark MB2, the corner portion mark MB3, and the corner portion mark MB4.

As shown in FIG. 5, the lower right corner of the corner portion mark MB1 is superimposed on the upper left corner of the corner portion mark MA1 to form a superimposed area DR1. The lower left corner of the corner portion mark MB2 is superimposed on the upper right corner of the corner portion mark MA2 to form a superimposed area DR2. The upper left corner of the corner portion mark MB3 is superimposed on the lower right corner of the corner portion mark MA3 to form the superimposed area DR3. The upper right corner of the corner portion mark MB4 is superimposed on the lower left corner of the corner portion mark MA4 to form the superimposed area DR4. The respective corner portion mark MA1, corner portion mark MA2, corner portion mark MA3, and corner portion mark MA4 are cyan solid images and the respective corner portion mark MB1, corner portion mark MB2, corner portion mark MB3, and corner portion mark MB4 are red solid images, and, therefore, the superimposed area DR1, the superimposed area DR2, the superimposed area DR3, and the superimposed area DR4 are displayed in white.

In the above described manner, the projection range of the second projector 200B, i.e., the second projection range RB is adjusted to cover the outer corner portions of the first marks MA with the second marks MB by the user's operation.

Further, as shown in FIG. 5, the second projector 200B detects the lens-shift adjustment, the zoom adjustment, and the focus adjustment performed by the user, and displays a guidance display part SD2.

The guidance display part SD2 is displayed as an OSD of the second projector 200B. In the guidance display part SD2, a message "LENS-SHIFT IN EXECUTION [RETURN] END" is displayed. That is, the guidance display part SD2 shows that the second projection range RB is in adjustment by the user. Further, the guidance display part SD2 shows that the adjustment of the second projection range RB is ended when the return button is pressed.

The user controls the second projector 200B to execute stacking assist processing according to the guidance displayed in the message display portion MG1.

Specifically, when the first projector 200A detects user's operation to press down the YES button BY of the adjustment instruction display part SD1 displayed as the OSD by the first projector 200A, the first projector 200A instructs the second projector 200B to execute stacking assist processing. The second projector 200B executes the stacking assist processing according to the instruction from the first projector 200A.

The stacking assist processing is processing of adjusting the second projection range RB to make the second projection range RB coincide with the first projection range RA.

Specifically, the following processing is executed in the stacking assist processing. The second projector 200B acquires a geometric correction value of the first projector 200A and sets the acquired geometric correction value. Further, the second projector 200B controls the camera 247 to capture the first projected image P1 and the second projected image P2 to generate a captured image Q. Then, the second projector 200B adjusts the second projection range RB to make the second projection range RB coincide with the first projection range RA based on the captured image Q.

As explained with reference to FIGS. 4 and 5, when the second projection range RB is adjusted, the first projector 200A displays the first marks MA as the first projected image P1 and the second projector 200B displays the second marks MB as the second projected image P2. The first marks MA include the corner portion mark MA1 to corner portion mark MA4, and the respective corner portion mark MA1 to corner portion mark MA4 are e.g. rectangular cyan solid images. Further, the second marks MB include the corner portion mark MB1 to corner portion mark MB4, and the respective corner portion mark MB1 to corner portion mark MB4 are e.g. rectangular red solid images.

Accordingly, the superimposed areas DR of the respective corner portion mark MA1 to corner portion mark MA4 and the corner portion mark MB1 to corner portion mark MB4 are displayed in white. Therefore, the user may easily visually recognize the superimposed areas DR.

The respective corner portion mark MA1 to corner portion mark MA4 are e.g. rectangular cyan solid images, and the respective corner portion mark MB1 to corner portion mark MB4 are e.g. rectangular red solid images. Therefore, the user may easily visually recognize the first projection range PA and the second projection range RB.

Figure 6:
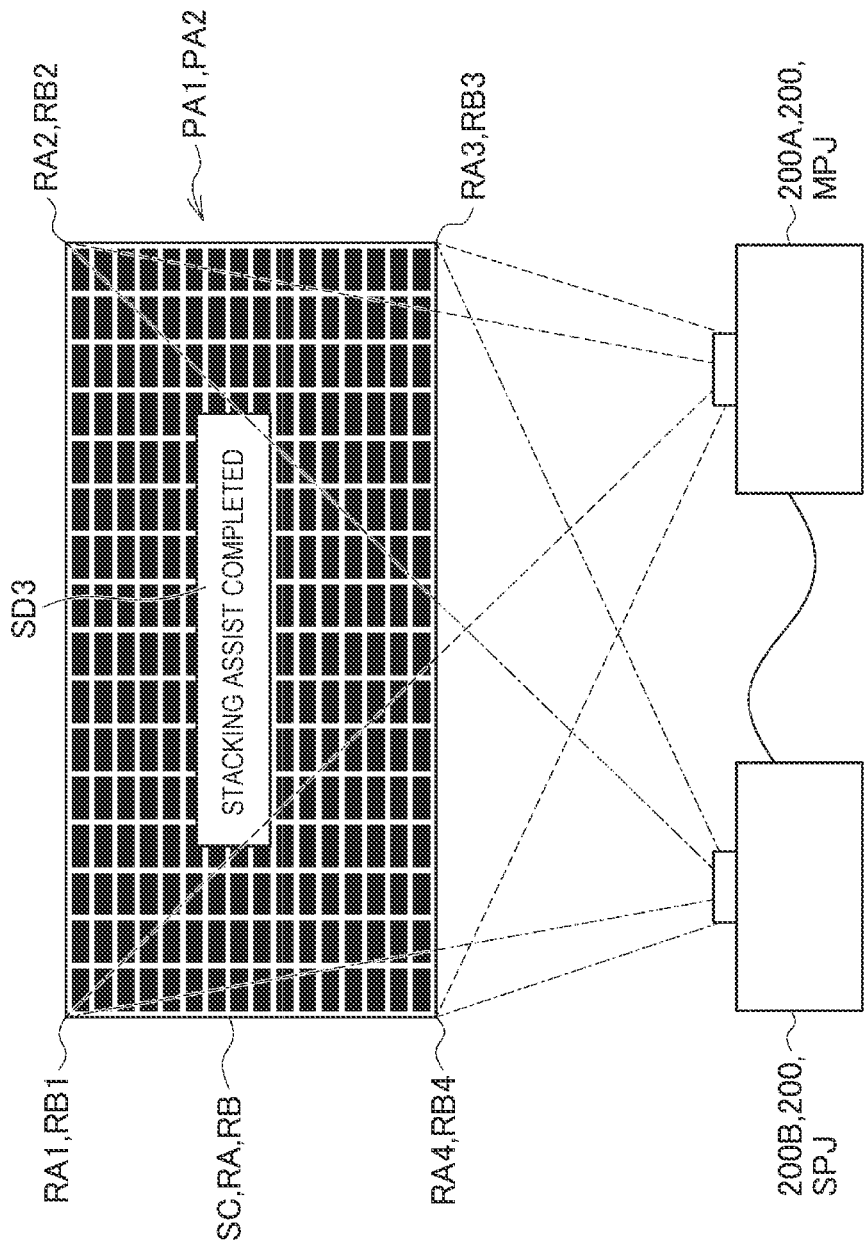
FIG. 6 shows an example of adjustment result confirmation images.

FIG. 6 shows an example of adjustment result confirmation images PA1, PA2.

When the stacking assist processing by the second projector 200B ends, the first projector 200A displays the adjustment result confirmation image PA1 and the second projector 200B displays the adjustment result confirmation image PA2.

Specifically, when the stacking assist processing by the second projector 200B ends, the second projector 200B transmits adjustment completion information to the first projector 200A. The adjustment completion information represents completion of the adjustment of the second projection range RB. Further, the second projector 200B displays a guidance display part SD3 as an OSD and displays the adjustment result confirmation image PA2. When receiving the adjustment completion information, the first projector 200A displays the adjustment result confirmation image PA1.

The guidance display part SD3 displays guidance showing completion of the adjustment of the second projection range RB. For example, the guidance display part SD3 displays guidance "STACKING ASSIST COMPLETED".

The respective adjustment result confirmation image PA1 and adjustment result confirmation image PA2 are pattern images containing grid patterns of white lines.

When the adjustment result confirmation image PA1 and the adjustment result confirmation image PA2 do not coincide, the grid patterns of white lines do not coincide in the display. The user may visually recognize whether or not the second projection range RB coincides with the first projection range RA based on whether or not the grid patterns of white lines coincide.

Figure 7:
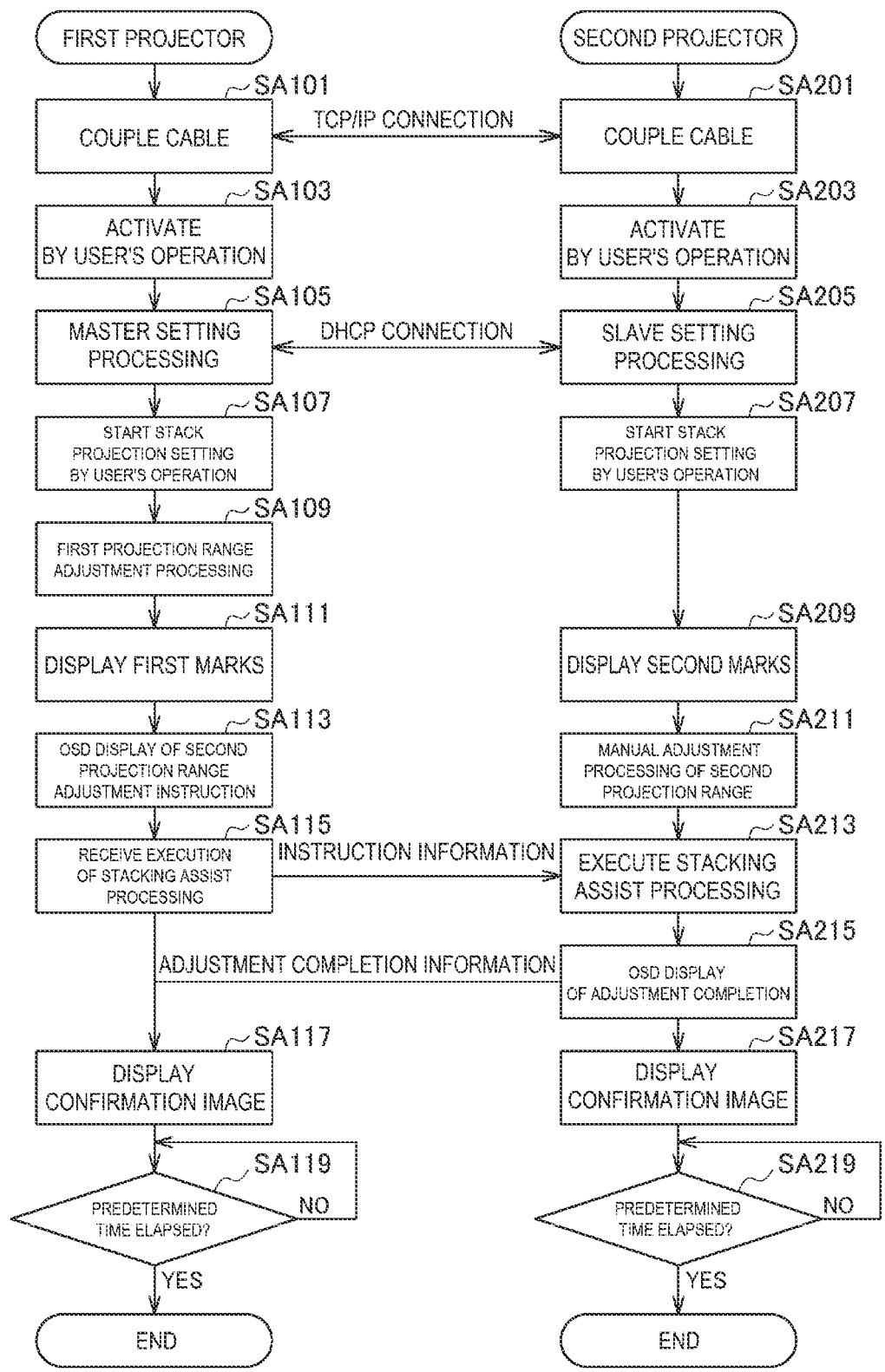
FIG. 7 is a flowchart showing an example of processing of the image projection system according to a first embodiment.

FIG. 7 is a flowchart showing an example of processing of the image projection system 1 according to the first embodiment. Specifically, FIG. 7 is the flowchart showing an example of processing by the control section 250 of the first projector 200A and processing by the control section 250 of the second projector 200B according to the first embodiment.

Note that, in the following explanation, for convenience, the control section 250 of the first projector 200A may be referred to as "first projector 200A" and the control section 250 of the second projector 200B may be referred to as "second projector 200B".

In the respective first projector 200A and second projector 200B, DHCP settings are set to be ON in advance.

First, at step SA101, the first projector 200A is coupled to the cable CB and, at step SA201, the second projector 200B is coupled to the cable CB. Then, the first projector 200A and the second projector 200B are communicably coupled via the cable CB according to the TCP/IP standards.

Then, at step SA103, the first projector 200A is activated by operation from the user. Further, at step SA203, the second projector 200B is activated by operation from the user.

Then, at step SA105, the first projector 200A is set as a master projector MPJ by the DHCP settings. Further, at step SA205, the second projector 200B is set as a slave projector SPJ.

Then, at step SA107, in the first projector 200A, stack projection setting is started by user's operation. Further, at step SA207, in the second projector 200B, stack projection setting is started by user's operation.

Then, at step SA109, the first projector 200A projects the first projected image P1 by user's operation and adjusts the first projection range RA by user's operation.

Then, at step SA11, the first projector 200A displays the first marks MA by user's operation. Further, at step SA209, the second projector 200B displays the second marks MB by user's operation.

Then, at step SA113, the first projector 200A displays adjustment of the second projection range RB in the OSD by user's operation. For example, the first projector 200A displays the adjustment instruction display part SD1 shown in FIG. 4 in the OSD.

Then, at step SA211, the second projector 200B adjusts the second projection range RB by user's operation.

Then, at step SA115, the first projector 200A receives execution of stacking assist processing from the user. The first projector 200A transmits instruction information of execution of stacking assist processing to the second projector 200B.

Then, at step SA213, the second projector 200B executes stacking assist processing according to the instruction information from the first projector 200A.

After the stacking assist processing by the second projector 200B is completed, at step SA215, the second projector 200B displays a message showing completion of the adjustment of the second projection range RB in the OSD. The second projector 200B displays e.g. the guidance display part SD3 shown in FIG. 3 in the OSD. Further, the second projector 200B transmits adjustment completion information representing completion of the adjustment of the second projection range RB to the first projector 200A.

Then, at step SA117, when receiving the adjustment completion information from the second projector 200B, the first projector 200A displays the adjustment result confirmation image PA1. Further, at step SA217, the second projector 200B displays the adjustment result confirmation image PA2.

Then, at step SA119, the first projector 200A determines whether or not a predetermined time elapses from the time when starting display of the adjustment result confirmation image PA1. The predetermined time is e.g. ten seconds.

When the first projector 200A determines that the predetermined time does not elapse (step SA119; NO), the processing is in a standby status. When the first projector 200A determines that the predetermined time elapses (step SA119; YES), the processing ends.

Further, at step SA219, the second projector 200B determines whether or not a predetermined time elapses from the time when starting display of the adjustment result confirmation image PA2. The predetermined time is e.g. ten seconds.

When the second projector 200B determines that the predetermined time does not elapse (step SA219; NO), the processing is in a standby status. When the second projector 200B determines that the predetermined time elapses (step SA219; YES), the processing ends.

As explained with reference to FIGS. 3 to 7, the user couples the cable CB to the first projector 200A and the second projector 200B, and the user operates the first projector 200A and the second projector 200B, and thereby, may adjust the second projection range RB to make the second projection range RB coincide with the first projection range RA. Accordingly, the stack projection may be executed using the first projector 200A and the second projector 200B. Therefore, the network environment is easily set up and user's work may be simplified.

Second Embodiment

Figure 8:
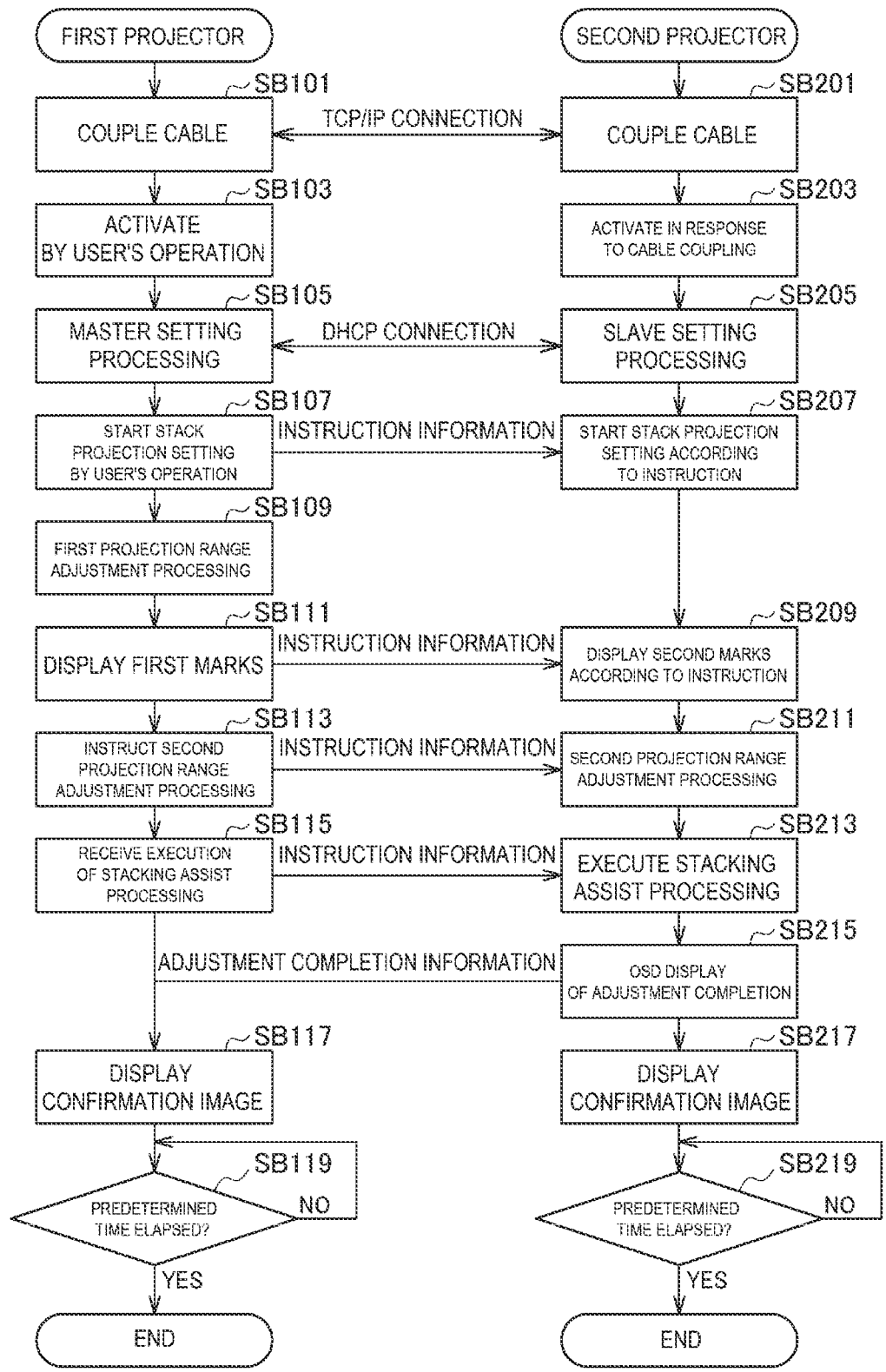
FIG. 8 is a flowchart showing an example of processing of the image projection system according to a second embodiment.

FIG. 8 is a flowchart showing an example of processing of the image projection system 1 according to the second embodiment. Specifically, FIG. 8 is the flowchart showing an example of processing by the control section 250 of the first projector 200A and processing by the control section 250 of the second projector 200B according to the second embodiment.

Note that, in the following explanation, for convenience, the control section 250 of the first projector 200A may be referred to as "first projector 200A" and the control section 250 of the second projector 200B may be referred to as "second projector 200B".

In the respective first projector 200A and second projector 200B, DHCP settings are set to be ON in advance.

The processing at step SB115 to step SB119 is the same as the processing at step SA115 to step SA119 shown in FIG. 7. Further, the processing at step SB213 to step SB219 is the same as the processing at step SA213 to step SA219 shown in FIG. 7. Accordingly, in the following explanation, the explanation of the processing at step SB115 to step SB119 and the processing at step SB213 to step SB219 will be omitted.

First, at step SB101, the first projector 200A is coupled to the cable CB and, at step SB201, the second projector 200B is coupled to the cable CB. Then, the first projector 200A and the second projector 200B are communicably coupled via the cable CB according to the TCP/IP standards.

Then, at step SB203, the second projector 200B is activated when the cable CB is coupled. For example, the second projector 200B is activated when detecting communicably coupling to the first projector 200A by the cable CB.

Then, at step SB103, the first projector 200A is activated by operation from the user.

Further, at step SB105, the first projector 200A is set as a master projector MPJ by the DHCP settings. Furthermore, at step SB205, the second projector 200B is set as a slave projector SPJ.

Then, at step SB107, in the first projector 200A, stack projection setting is started by user's operation. Then, the first projector 200A transmits instruction information of the start of stacking assist setting to the second projector 200B.

Further, at step SB207, the second projector 200B starts the stack projection setting according to the instruction from the first projector 200A.

Then, at step SB109, the first projector 200A projects the first projected image P1 by user's operation and adjusts the first projection range RA by user's operation.

Then, at step SB111, the first projector 200A displays the first marks MA by user's operation. Then, the first projector 200A transmits instruction information of display of the second marks MB to the second projector 200B.

Then, at step SB209, the second projector 200B displays the second marks MB according to the instruction from the first projector 200A.

Then, at step SB113, the first projector 200A receives adjustment processing of the second projection range RB for the second projector 200B by user's operation. Further, the first projector 200A transmits instruction information to instruct adjustment processing of the second projection range RB to the second projector 200B.

Then, at step SB211, the second projector 200B executes the adjustment processing of the second projection range RB according to the instruction from the first projector 200A.

As explained with reference to FIG. 8, the user operates the first projector 200A, and thereby, may transmit various kinds of instruction information to the second projector 200B and control the second projector 200B to execute processing corresponding to the instruction information. Therefore, the user's work may be simplified.

Embodiments and Functions and Effects

As explained with reference to FIGS. 1 to 8, a control method for the first projector 200A according to the embodiments is a control method for the first projector 200A communicably coupled to the second projector 200B, including setting the second projector 200B as the projector for stack projection, determining the first projection range PA indicating the range in which the image is projected, and controlling the second projector 200B to adjust the second projection range RB indicating the range in which the second projector 200B projects the image to make the second projection range RB coincide with the first projection range PA.

That is, the first projector 200A sets the second projector 200B as the projector for stack projection, and controls the second projector 200B to adjust the second projection range RB to make the second projection range RB coincide with the first projection range RA.

Therefore, stack projection may be executed by the first projector 200A and the second projector 200B. Therefore, the network environment is easily set up and user's work for stack projection may be simplified.

Further, the operation to adjust the second projection range RB from the user is received and the instruction information corresponding to the received operation is transmitted to the second projector 200B.

Therefore, the user may perform the operation to adjust the second projection range RB on the first projector 200A. Therefore, the projector operated by the user may be consolidated to the first projector 200A, and thereby, the user's work for stack projection may be simplified.

Furthermore, the first marks MA showing the positions of the corner portions of the first projection range RA are displayed, the second projector 200B is controlled to display the second marks MB showing the positions of the corner portions of the second projection range RB, and the second projector 200B is controlled to adjust the second marks MB to coincide with the first marks MA.

Accordingly, the second marks MB are adjusted to coincide with the first marks MA, and thereby, the second projection range RB may be adjusted to coincide with the first projection range RA. Therefore, the second projection range RB may be adjusted by simpler processing.

As explained with reference to FIG. 8, when the second projector 200B is communicably coupled by the cable CB, the second projector 200B is activated.

Accordingly, the operation to activate the second projector 200B by the user may be omitted. Therefore, the user's work for stack projection may be simplified.

Further, the second projector 200B is set so that the second projector 200B operates according to the instruction information from the first projector 200A when the second projector 200B is communicably coupled by the cable CB.

Accordingly, the second projector 200B is set so that the second projector 200B operates according to the instruction information from the first projector 200A, and thereby, the operation on the second projector 200B may be changed to the operation on the first projector 200A. Therefore, the projector operated by the user may be consolidated to the first projector 200A, and thereby, the user's work for stack projection may be simplified.

The first projector 200A according to the embodiments is the first projector 200A including the control section 250 and communicably coupled to the second projector 200B, and the control section 250 sets the second projector 200B as the projector for stack projection, determines the first projection range RA indicating the range in which the image is projected, and controls the second projector 200B to adjust the second projection range RB indicating the range in which the second projector 200B projects the image to make the second projection range RB coincide with the first projection range RA.

Therefore, the same effects as those of the control method for the first projector 200A according to the embodiments may be exerted.

The image projection system 1 according to the embodiments is the image projection system 1 including the first projector 200A and the second projector 200B communicably coupled to the first projector 200A, and the first projector 200A sets the second projector 200B as the projector for stack projection, determines the first projection range RA indicating the range in which the image is projected, and controls the second projector 200B to adjust the second projection range RB indicating the range in which the second projector 200B projects the image to make the second projection range RB coincide with the first projection range RA.

Therefore, the image projection system 1 according to the embodiments may exert the same effects as those of the control method for the first projector 200A according to the embodiments.

Other Embodiments

The above described embodiments are preferred embodiments. Note that the present disclosure is not limited to the above described embodiments, but various modifications can be made without departing from the scope thereof.

In the embodiments, referring to FIGS. 1 to 8, the case where each of the first projector 200A and the second projector 200B includes the camera 247 is explained, however, the present disclosure is not limited to the case. It is only necessary that the image projection system 1 has a camera and each of the first projector 200A and the second projector 200B can acquire captured images of the camera.

It is only necessary that the image projection system 1 has at least one camera. For example, one camera may capture an image containing the first projected image P1, the second projected image P2, and the screen SC and generate a captured image, and each of the first projector 200A and the second projector 200B may acquire the captured image.

In the embodiments, when the second projection range RB is adjusted, the first projector 200A displays the first marks MA as the first projected image P1 and the second projector 200B displays the second marks MB as the second projected image P2, however, the present disclosure is not limited to that. The first projector 200A and the second projector 200B may display pattern images or solid images.

The respective functional units shown in FIG. 2 show the functional configurations and the specific implementation forms are not particularly limited. That is, hardware individually corresponding to the respective functional units is not necessarily mounted, but one processor can realize functions of a plurality of functional units by executing a program. Further, a part of the functions realized by software in the above described embodiments may be realized by hardware, or a part of the functions realized by hardware in the above described embodiments may be realized by software. In addition, specific detailed configurations of the other respective units of the projector 200 can be arbitrarily changed without departing from the scope of the present disclosure.

The units of processing of the flowcharts shown in FIGS. 7 and 8 are formed by division according to main pieces of processing for easy understanding of the processing by the control section 250 of the first projector 200A and processing by the control section 250 of the second projector 200B. The present disclosure is not limited by the manner of division and the names of the units of processing shown in the respective flowcharts of FIGS. 7 and 8, and the processing may be divided to the larger number of units of processing according to the details of processing or divided so that one unit of processing includes more pieces of processing. The sequences of the processing in the above described flowcharts are not limited to the illustrated examples.

The control method for the first projector 200A may be realized by controlling the processor 253 of the first projector 200A to execute the control program corresponding to the control method for the first projector 200A. Further, the control program can be recorded in a computer-readably recorded recording medium. As the recording medium, a magnetic, optical recording medium or a semiconductor memory device may be used. Specifically, a portable or stationary recording medium including a flexible disc, an HDD, a CD-ROM (Compact Disk Read Only Memory), a DVD, a Blu-ray (registered trademark) Disc, a magnetooptical disc, a flash memory, and a card-shaped recording medium may be used. Further, the recording medium may be a nonvolatile storage device such as a RAM, a ROM, or an HDD as an internal storage device provided in the first projector 200A. Or, the control program corresponding to the control method for the first projector 200A may be stored in a server or the like and the control program may be downloaded from the server to the first projector 200A, and thereby, the control method for the first projector 200A may be realized.

What is claimed is:

1. A projector control method comprising:
coupling a first projector to a second projector;
transmitting from the first projector to the second projector a first instruction representing a start of setting of stack projection using the first projector and the second projector;
setting a first projection range indicating a range in which the first projector projects an image for the stack projection;
transmitting from the first projector to the second projector a second instruction representing adjustment for the second projector to make to a second projection range of the second projector indicating a range in which the second projector projects an image which coincides with the first projection range of the first projector;
displaying first mark showing position of corner portion of the first projection range by the first projector;
controlling the second projector from the first projector to display a second mark showing position of corner portion of the second projection range; and
transmitting from the first projector to the second projector a stacking assist instruction representing adjustment of the second projection range to make the positions of the second mark coincide with the position of the first mark.

2. The projector control method according to claim 1, further comprising:
receiving operation from a user of the first projector to adjust the second projection range; and
transmitting from the first projector to the second projector a third instruction corresponding to the received operation from the user of the first projector to adjust the second projection range.

3. The projector control method according to claim 1, wherein
when the first projector and the second projector are communicably coupled by a cable, the second projector is activated.

4. The projector control method according to claim 1, wherein
when the first projector and the second projector are communicably coupled by a cable, the first projector transmits to the second projector a change of setting instruction for the second projector to operate according to instruction from the first projector.

5. A projector comprising:
one or more processors programmed to:
transmit from a main projector to a second projector a first instruction representing a start of setting by the main projector and the second projector of stack projection using the main projector and the second projector,
set a first projection range indicating a range in which the main projector projects an image for the stack projection,
transmit from the main projector to the second projector a second instruction representing a for the second projector to start of adjustment to make a second projection range of the second projector indicating a range in which the projector projects an image coincide with the first projection range,
display first mark showing position of corner portion of the first projection range by the first projector,
control the second projector from the first projector to display a second mark showing position of corner portion of the second projection range, and
transmit from the first projector to the second projector a stacking assist instruction representing adjustment of the second projection range to make the positions of the second mark coincide with the position of the first mark.

6. An image projection system comprising:
a main projector; and
a sub-projector communicably coupled to the main projector, wherein
the main projector transmits to the sub-projector a first instruction representing a start of setting of stack projection using the main projector and the sub-projector,
the main projector sets a first projection range indicating a range in which the main projector projects an image for the stack projection, and
the main projector transmits to the sub-projector a second instruction representing for the sub-projector to start to make adjustment of a second projection range of the sub-projector indicating a range in which the sub-projector projects an image which coincides with the first projection range, and
the sub-projector starts the setting of stack projection based on the first instruction, and
the sub-projector starts the adjustment of the second projection range based on the second instruction.

* * * * *